No. 790,036. PATENTED MAY 16, 1905.
F. DEUSY.
PROCESS OF REFINING SUGAR.
APPLICATION FILED JULY 18, 1904.
2 SHEETS—SHEET 1.
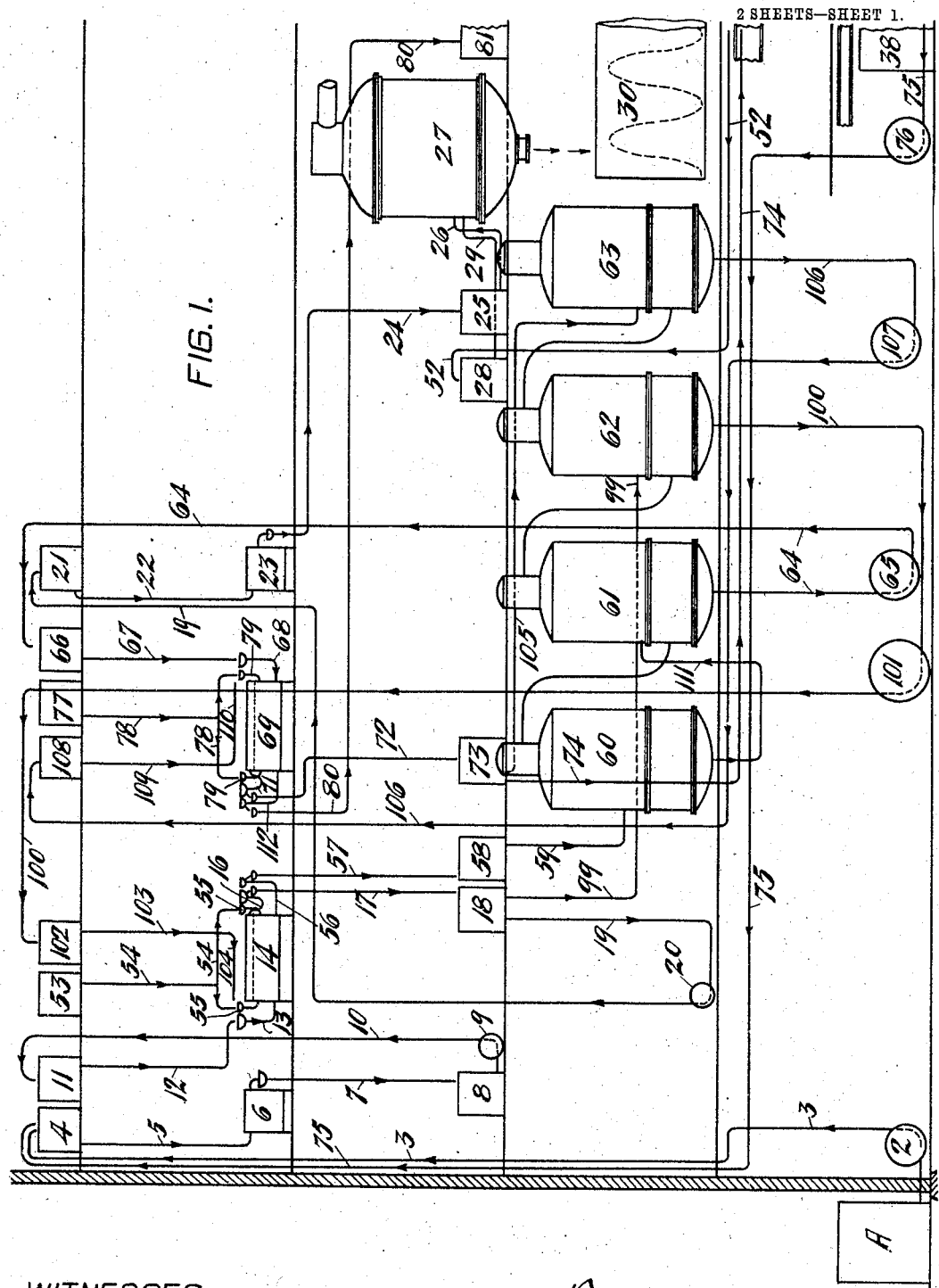

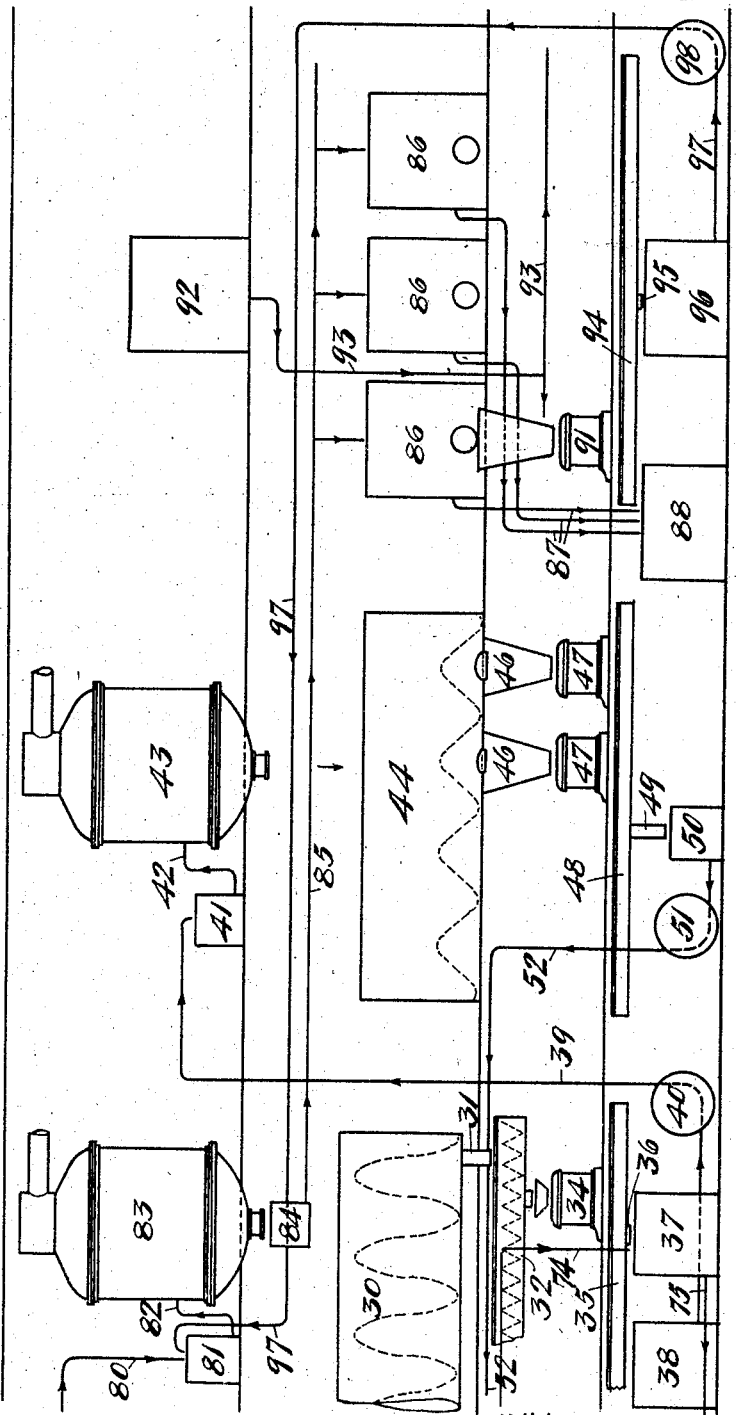

No. 790,036. Patented May 16, 1905.

UNITED STATES PATENT OFFICE.

FELIX DEUSY, OF SAN FRANCISCO, CALIFORNIA.

PROCESS OF REFINING SUGAR.

SPECIFICATION forming part of Letters Patent No. 790,036, dated May 16, 1905.

Application filed July 18, 1904. Serial No. 217,066.

*To all whom it may concern:*

Be it known that I, FELIX DEUSY, a citizen of France, residing at San Francisco, county of San Francisco, and State of California, have invented new and useful Improvements in Processes of Refining Sugar and Recovering Salts of Potassium, as Nitrate of Potash, from the Sugar-Molasses, of which the following is a specification.

My invention relates to improvements in treating sugar-molasses, and pertains especially to the refining of the sugar and the recovery of the salts of potassium in the molasses as nitrate of potash.

Generally in sugar-refineries or sugar-factories using the osmose process no successful effort is made to extract the sugar and the valuable salts of potash contained in the exosmose water. After the molasses has been subjected to osmose the exosmose water is generally allowed to go to waste, and the molasses resulting from centrifuging is sold at a nominal price to the distilleries.

The object of my invention is to provide a method of treating the molasses and the exosmose water so that not only a very much larger percentage of sugar may be recovered than by ordinary methods, but there shall be saved all the values in the form of salts of potash.

The invention resides in the method hereinafter described and claimed and may be practiced by an apparatus, as illustrated in the accompanying drawings, in which—

Figure 1 is a diagrammatic view of part of the apparatus, and Fig. 2 is a continuation of the same.

For convenience in operation the various parts of the apparatus are arranged on different floors or levels in a building, so that much of the flowage of the liquids may take place by gravity, the return or passage from a lower to a higher level being effected by suitable means, as centrifugal pumps.

A represents a reservoir or source of supply for molasses intended to undergo treatment, and which molasses is for present purposes termed "initial" molasses. This initial molasses contains usually about fifty per cent. of sugar in a state, however, not readily crystallized. It also contains about 2.5 per cent., by weight, of potash.

The initial molasses is sent from the tank A by the pump 2, through the pipe 3, to the upper floor of the factory, where it falls into the tank 4. A steam-coil in this tank heats the molasses to about 100° centigrade. At this temperature the molasses runs down pipe 5, through the mechanical filter 6, and thence by the pipe 7 into the tank 8. The pump 9 and the pipe 10 send the molasses into the filtered-molasses tank 11, where the molasses is again heated to about 100° centigrade. From the tank 11 it flows by the pipes 12 and 13 through the osmogene 14, is osmosed, and is delivered thence by the pipes 16 and 17 into the tank 18. By the pump 20 and the suction-pipe 19 the osmosed molasses is sent to the sulfuration-tank 21, where the molasses is treated with sulfurous-acid gas and boiled. From there it passes by pipe 22 to the mechanical filter 23, and from the filter flows as a clear liquid through pipe 24 into the tank 25, where it awaits boiling in the vacuum-pan 27. This osmosed molasses in the tank 25 is from fifteen to twenty per cent. purer than the initial molasses of tank A and has a density of about 20° Baumé.

28 is a tank containing a sugar solution or syrup of approximately 90° purity and having a specific gravity of about 20° to 30° Baumé. The intention is to use this solution in the vacuum-pan as a nucleus for the granulation of the sugar contained in the osmosed molasses of tank 25. In practice there is first introduced into pan 27 a portion of this pure sugar solution equal to about two-fifths of the total volume of solution and molasses to be contained in the vacumm-pan—that is, if one hundred gallons represent the capacity of the pan there would first be introduced forty gallons of sugar solution from tank 28 and afterward sixty gallons of osmosed molasses from tank 25. However, the sugar-syrup from tank 28 is first concentrated by boiling, and the operator so manages the apparatus as to get a considerable quantity of crystallized sugar in the pan. The osmosed molasses is then gradually introduced in frequent small charges and the mixture boiled in grain. When the boiling is over, there is a resulting "masse-cuite" containing only from eight to ten per cent. of water. This masse-cuite is discharged into the crystallizer 30, where it undergoes agitation during two or three days. From the crystallizer the masse-cuite is discharged into the centrifugal 34 by means of pipe 31 and the screw conveyer 32. In the centrifugal 34 the sugar contained in the masse-cuite is separated from the molasses. The separated molasses is discharged into the gutter 35 and from there by pipe 36 into the tank 37 to await further treatment. The purity of this molasses is about the same as the purity of the initial molasses of tank A, with which it is again mixed, as hereinafter described. The raw sugar from the centrifugal, which is about ninety-eight per cent. of purity, falls into the tank 38, where it is dissolved in hot water. Thence it is sent as sugar-syrup through the pipe 39 and the pump 40 into the tank 41, which is the waiting-tank of the vacuum-pan for refined sugar. From the tank 41 the syrup is aspirated into the vacuum-pan 43 by the pipe 42 and is boiled as refined sugar. The boiling over, the masse-cuite falls into the mixer 44. From the mixer the masse-cuite is delivered, through the spout 46, into the centrifugals 47, where during treatment the sugar is washed with cold water. After that it is sent to the drier, whence it comes out in the state of refined sugar. The wash-syrup coming out of the centrifugals 47 falls into the gutter 48 and from a pipe 49 drops into the tank 50. It is a wash-syrup of very great purity and by pump 51 is sent into tank 28 through the pipe 52, there to be used as sugar-syrup in the vacuum-pan 27 for boiling the osmosed molasses, as before described.

53 is a hot-water tank containing a steam-coil by which the water in the tank is heated to about 100° centigrade. This water is used to supply osmogene 14. It comes out of tank 53 by pipe 54 and goes into the osmogene by pipe 55 and comes out of the osmogene in the state of exosmose water by pipe 56 and is carried by pipe 57 into tank 58. From tank 58 it is sent by the pipe 59 into pan 60, which is the first pan of my so-called "quadruple" effect, where it is partly concentrated, and from there passes by pipe 111 into the second pan 61, where it is finally concentrated to about 25° Baumé. From this pan it is sent by pipe 64 and pump 65 into the tank 66 as saline molasses. This saline molasses has a purity of about 0.35 and a saline quotient of about 1.3.

In the tank 66 the saline molasses is heated to about 100° centigrade and is thence conveyed by the pipes 67 and 68 to the osmogene 69, where it undergoes a second osmose or "regeneration," as it is termed. This regenerated molasses comes out by pipe 71 and passes by pipe 72 into tank 73. From tank 73 the regenerated molasses flows by pipe 74 into tank 37, where it is mixed with the molasses coming from the centrifugal 34, previously mentioned. The regenerated molasses has a purity of from 2° to 3° in excess of the initial molasses in tank A. The mixture of these two molasses is taken by a suction-pipe 75 and pump 76 into tank 4, where it is mixed with the initial molasses. The tank 4 contains then a mixture of three kinds or grades of molasses, to wit: first, initial molasses; second, molasses from centrifugal 34; third, regenerated molasses from osmogene 69 via tank 73. If the working has been skillfully conducted, the mixture of the three molasses in tank 4 is from 1° to 2° purer than the initial molasses of tank A.

77 is a hot-water tank containing water heated to about 100° centigrade. This hot water is for the osmogene 69, to which it passes by the pipes 78 and 79, goes through the osmogene and comes out as reosmose water by the pipe 112, is delivered into pipe 80, and by that pipe into the tank 81. Tank 81 is the waiting-tank of the vacuum-pan 83 for boiling the reosmose water to effect a separation of the salts and waste liquors. To the reosmose water in this tank is added a quantity of nitrate of sodium in proportion to the amount of the salts of potassium (chlorid of potassium and organic salts of potassium) contained in that water. The latter also contains some nitrate of potassium. This addition of nitrate of sodium will transform the chlorid of potassium and the organic salts of potassium into nitrate of potash. Just the quantity or proportion to be added of nitrate of soda cannot be stated, as each particular case will differ. In general it may be said that the required amount will be determined by analysis of the reosmose water. While it will not hurt to add an excess of nitrate of soda, since it will enrich the waste products for use as fertilizer, still the cost of sodium nitrate renders it undesirable to use an unnecessary quantity. The reosmose water in tank 81 prior to the addition of the nitrate of sodium has a purity between 0.14 and 0.15 and a saline quotient between 0.40 and 0.50. From tank 81 the reosmose water is delivered by the suction-pipe 82 into the vacuum-pan 83, where it is concentrated so as to have a density between 30° and 40° Baumé. When the reosmose water is sufficiently concentrated, it goes to tank 84 and thence by pipe 85 into one of the tanks 86. After remaining from fifteen to twenty days in tanks 86 the nitrate of potassium is completely crystallized and deposited on the walls and bottoms of the tanks. The exhausted saline water is taken from tanks 86 by pipes 87 and collected in tank 88, whence it may be allowed to go to waste, or, preferably, is further concentrated in a vacuum-pan and afterward mixed with some anhydrid of lime, the mixture forming an excellent fertilizer.

When the exhausted saline water has been withdrawn from tanks 86, there remains the crystallized nitrate of potash, which is next delivered into the centrifugal, where it is worked and washed first with some very cold water and after with a cold solution of saturated nitrate of potash coming from tank 92 by pipe 93. All this wash-water falls from the centrifugal 91 into the gutter 94 and thence by the pipe 95 into the tank 96. The wash-water in tank 96 contains a large amount of nitrate of potash, and in order that it be utilized and subsequently saved it is sent by the pipe 97 and pump 98 into the tank 81, where it is mixed with the reosmose water waiting concentration.

I have discovered that if a certain amount of concentrated osmosed molasses is added to the molasses undergoing osmose in the several osmogenes the osmotic power of the apparatus is very much increased, thereby increasing the purity of the molasses undergoing osmose. Consequently all the osmose molasses coming from the osmogene 14 is not sent immediately into the sulfuration-tank 21 and from there to the vacuum-pan 27, but a part is aspirated into the third pan 62 of the quadruple effect by the pipe 99, where it is concentrated to about 40° Baumé. At that density it is aspirated by the pipe 100 and sent through the pump 101 into the tank 102. There it is heated to a temperature of about 100° centigrade and delivered by the pipes 103 and 104 into the top of the osmogene, where it commingles with the molasses undergoing osmose and serves to raise the mean density of the entire molasses body to 20° or 25° Baumé. Likewise all the regenerated molasses produced by osmogene 69 is not sent immediately into the tank 37, but a part of that molasses is taken by pipe 105 into the fourth pan 63 of the quadruple effect, where it is concentrated to a density between 30° and 40° Baumé. After that it is conveyed by pipe 106 and pump 107 into the tank 108, where it is heated. Thence it is delivered by pipes 109 and 110 to the osmogene 69 and mixed with the molasses therein undergoing osmose.

By this process I recover practically all the values of the molasses either as refined sugar or as nitrate of potash. For starting with unrefined molasses I save about eighty per cent. of the sugar as against fifty per cent. or less by the old process and extract substantially all the salts of potassium as nitrate of potash which before were allowed to go entirely to waste.

The process is a complete process. It is, moreover, very simple and can be practiced during the ordinarily idle season of the factory.

Having thus described my invention, what I claim, and desire to secure by Letters Patent, is—

1. The process of treating molasses which comprises the osmose of the molasses, adding the osmosed molasses to a solution of sugar-syrup, boiling the mixture, separating the sugar from the mixture and refining the sugar so separated, reosmosing the molasses residue incident on said separation, concentrating the exosmose water to a state of saline molasses, subjecting this saline molasses to osmose, recovering the sugar from the regenerated molasses and the salts of potassium from the reosmose water.

2. The process of recovering salts of potassium and refined sugar from molasses which comprises the osmose of the initial molasses, the concentration and separation of the osmosed molasses, the concentration of the exosmose water, reosmose of said concentrated exosmose water, adding nitrate of sodium to said reosmose water, boiling said mixture and finally collecting the salts of potash in settling-tanks.

3. The process of recovering salts of potassium and refined sugar from molasses which comprises the osmose of the initial molasses, the concentration and separation of the osmosed molasses, the concentration of the exosmose water, reosmose of said concentrated exosmose water, adding nitrate of sodium to said reosmose water, boiling said mixture and finally collecting the salts of potash in settling-tanks, washing the salts so collected separate from the exhausted reosmose water and using said wash-water to mix again with the reosmose water prior to said boiling.

4. In the process of treating molasses and as a part thereof, the concentration of the exosmose water, running this concentrated exosmose water through an osmogene to regenerate the molasses, recovering the sugar from said regenerated molasses, collecting the reosmose water, adding nitrate of sodium to said reosmose water and collecting the salts of potassium.

5. In the process of treating molasses and as a part thereof, the osmose of the initial molasses, the mixing of the osmosed molasses with a sugar-syrup solution, boiling this mixture in grain, centrifuging the boiled mixture, dissolving the sugar so separated and refining this solution.

6. In the process of treating molasses and as a part thereof, the osmose of the initial molasses, the mixing of the osmosed molasses with a sugar-syrup solution, boiling this mixture in grain, centrifuging the boiled mixture, dissolving the sugar so separated, boiling this solution as refined sugar, centrifuging this boiled product, washing the refined sugar produced by this last centrifuging and using the wash-water as a sugar-syrup for the said mixing with the osmosed molasses.

7. In the process of treating molasses and as a part thereof, the osmose of the initial molasses, the concentration of the exosmose water, reosmose of said concentrated water adding a suitable salt to said reosmose water to convert the salts of potash in said water into nitrate of potash and recovering the nitrate of potash from said solution.

8. The process of treating molasses which comprises the osmose of the initial molasses and the subsequent treatment of the osmose molasses and the exosmose water whereby the osmose molasses is mixed with a sugar-syrup solution, and the refined sugar recovered therefrom, the exosmose water being concentrated, reosmosed and the salts of potash finally recovered from the said reosmosed water.

9. The process of treating molasses which comprises the osmose of the initial molasses and the subsequent treatment of the osmosed molasses and the exosmose water whereby the osmose molasses is mixed with a sugar-syrup solution, and the refined sugar recovered therefrom, the exosmose water being concentrated, reosmosed and the salts of potash finally recovered from the said reosmosed water, the regenerated molasses from the osmose of said concentrated exosmose water being returned and mixed with the initial molasses and resubjected to the operations above described in relation to said initial molasses.

In testimony whereof I have hereunto set my hand in presence of two subscribing witnesses.

FELIX DEUSY.

Witnesses:
HENRY P. TRICOU,
S. H. NOURSE.